United States Patent
Unehara et al.

(10) Patent No.: US 7,070,748 B2
(45) Date of Patent: Jul. 4, 2006

(54) NON-POROUS SPHERICAL SILICA AND METHOD FOR PRODUCTION THEREOF

(75) Inventors: Yasuhiro Unehara, Kanagawa (JP); Masashi Nishida, Tokyo (JP); Teruo Miyakawa, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/381,203

(22) PCT Filed: Sep. 26, 2001

(86) PCT No.: PCT/JP01/08389

§ 371 (c)(1),
(2), (4) Date: Mar. 27, 2003

(87) PCT Pub. No.: WO02/26626

PCT Pub. Date: Apr. 4, 2002

(65) Prior Publication Data

US 2003/0190276 A1  Oct. 9, 2003

(30) Foreign Application Priority Data

Sep. 27, 2000 (JP) ............................. 2000-293643
Dec. 7, 2000 (JP) ............................. 2000-373580

(51) Int. Cl.
*C01B 33/12* (2006.01)
*C01B 33/18* (2006.01)
*C01B 33/193* (2006.01)

(52) U.S. Cl. ....................... 423/338; 423/339; 423/335

(58) Field of Classification Search ................. 423/335, 423/338, 339
See application file for complete search history.

(56) References Cited

U.S. PATENT DOCUMENTS

| 4,806,329 A * | 2/1989 | Cho et al. .................... 423/339 |
| 5,607,887 A | 3/1997 | Pejryd et al. |
| 6,083,774 A * | 7/2000 | Shiobara et al. ............ 438/108 |
| 2003/0069347 A1 * | 4/2003 | Oishi et al. ................. 524/492 |

FOREIGN PATENT DOCUMENTS

| GB | 2279944 | 1/1995 |
| JP | 62-176928 | 8/1987 |
| JP | 1-230421 | 9/1989 |
| JP | 2-288 | 1/1990 |
| JP | 2-296711 | 12/1990 |
| JP | 4-37603 | 2/1992 |
| JP | 7-69617 | 3/1995 |
| JP | 2530225 | 6/1996 |
| JP | 10-324517 | 12/1998 |
| JP | 2000-63630 | 2/2000 |
| JP | 2000-7319 | 1/2002 |

* cited by examiner

*Primary Examiner*—Ngoc-Yen Nguyen
(74) *Attorney, Agent, or Firm*—Oblon, Spivak, McClelland, Maier & Neustadt, P.C.

(57) ABSTRACT

Non-porous spherical silica having a mean particle diameter of 0.1–20 μm and satisfying the following conditions:
(a) a maximum particle diameter is 4 times the mean particle diameter or less;
(b) $\eta_1/\eta_2 < 1.0$, wherein $\eta_1$ and $\eta_2$ are the viscosity of a 70:30 (by weight) mixture of the non-porous spherical silica and a Bisphenol A type liquid epoxy resin, as measured at a rotation number of 0.5 rpm and 2.5 rpm, respectively, in a viscometer.

3 Claims, No Drawings ated with 10 times by weight of ion exchanged water, the silanol residues on the particle surface are extracted and then the extract is measured by ion chromatograph).

NON-POROUS SPHERICAL SILICA AND METHOD FOR PRODUCTION THEREOF

TECHNICAL FIELD

The present invention relates to non-porous spherical silica and a process for producing the same. More particularly, the present invention relates to a process for producing non-porous spherical silica having a thorium content residing on a very low level, and suitable for use as a starting material of the filler of IC sealing resin composition, a substrate, an electronic material, a semiconductor manufacturing device, a high-purity silica glass, a quartz glass, an optical glass, etc. Especially, the present invention relates to non-porous spherical silica quite excellent in fluidity at the time of resin blending and permeability into narrow gaps when used as an underfill filler for flip chip, and to a process for producing said silica.

BACKGROUND ART

High-purity silica has been increasingly used in the recent years for manufacture of electronic materials and semiconductors as electronic industries have rapidly developed. In proportion with development of high-performance articles, not only higher purity but also improvement of other performances such as restriction of particle top size, high fluidity at the time of resin blending, etc. have become intensely required. Particularly, in the field of flip chip type semiconductor devices, non-porous spherical silica low in the coarse particle content and excellent in fluidity at the time of resin blending has become required as an underfill filler. In the field of underfill filler where a particular importance is on the viscosity at the time of resin blending, silica having a low viscosity and a low thixotropic ratio has become needed. As used herein, the term "thixotropic ratio" generally means a value obtained by measuring viscosity at varied rotation speed by a rotational viscometer such as B type viscometer and dividing the viscosity at a low rotation speed by the viscosity at a high rotation speed. Among the resins, epoxy resins and silicone resins are useful, and non-porous spherical silica showing a low thixotropic ratio particularly when mixed with Bisphenol A type liquid epoxy resin has been required.

As non-porous spherical silica low in coarse particle content, excellent in fluidity at the time of resin blending and showing a low thixotropic ratio, 1) fused spherical silica characterized in that the maximum particle diameter is 45 μm, the mean particle diameter is 2–10 μm, the ratio Sw1/Sw2 is 1.0–2.5 (Sw1 is specific surface area of the particle and Sw2 is theoretical specific surface area of the particle), and surface of the particle is smooth (JP-2000-7319),
2) fine spherical silica characterized in that the maximum particle diameter is 24 μm, the mean particle diameter is 1.7–7 μm, it has a particle size distribution with the value X1 of not smaller than 100/D50% by weight and not greater than (18+100/D50) by weight (X1 represents proportion of the particles having a size not larger than 3 μm to the total particles), and a mixture obtained by blending the fine spherical silica into liquid epoxy resin or silicone resin at ordinary temperature with a blending ratio of at most 80% by weight has a viscosity at 50° C. of 20 Pa·s or less (JP-2000-63630), etc. have so far been proposed.

However, since the non-porous spherical silica 1) is obtained by using fused spherical silica as a starting material, even if the superficial fine powder is dissolved away, the surface of the particle itself is also dissolved to leave irregularities on the particle surface and the superficial silanol residues. An expected fluidity cannot be obtained at the time of resin blending for this reason. The non-porous spherical silica 2) is also produced by substantially using fused spherical silica and, thus, has fine powder on its surface. Even if the fine powder is dissolved away as in the production of 1), an expected fluidity cannot be obtained for the same reason as mentioned above. Although the non-porous spherical silica of 1) and 2) show a low thixotropic ratio when measured at 5–10 rpm with viscometer, the viscosity tends to rise at a low rotation speed (i.e. thixotropic ratio tends to become greater).

This is not desirable for an application, such as an underfill material, in which silica is made to permeate by a mere capillary phenomenon in a static state. Thus, a filler having even lower thixotropic ratio has been awaited.

On the other hand, as processes for producing non-porous spherical silica, the followings have so far been proposed:
1) a process comprising melting crushed high-purity silica in flame and dissolving away the fine powder on the surface with an alkali or hydrofluoric acid (e.g. JP-2000-7319),
2) a process comprising hydrolyzing silicon alkoxide to obtain a sol-like solution and making the particles grow up in the sol (e.g. JP-B-2-288),
3) a process comprising hydrolyzing silicon alkoxide to obtain a sol-like solution, making the particles grow up to obtain spherical silica gel, and calcinating the spherical silica gel with flame (e.g. JP-A-2-296711),
4) a process for producing high-purity spherical silica, characterized by mixing a water-in-oil type (W/O type) emulsion prepared by finely dispersing an aqueous solution of alkali silicate as a dispersed phase with an water-in-oil type (W/O type) emulsion prepared by finely dispersing an aqueous solution of a mineral acid as a dispersed phase to form spherical silica gel, treating the spherical silica gel with a mineral acid to obtain spherical hydrated silica, drying the hydrated silica, followed by calcinating (JP-A-07-069617), and
5) a process comprising mixing fused spherical silica having a mean particle diameter of 2–7 μm from which coarse particles have been removed by sieving with spherical silica having a mean particle diameter of 0.3–1.0 μm which has been produced from metallic silicon (JP-A-2000-63630).

All the above-mentioned conventional processes for producing spherical silica respectively have disadvantages as mentioned below.

Thus, in the particle obtained by process 1), when the fine powder on its surface is dissolved away with an alkali or hydrofluoric acid, surface of the objective particle itself is also dissolved and, thus, the surface of the resultant particle is in a roughened state. Consequently, its fluidity at the time of resin blending cannot be high, even though the specific surface area is close to the theoretical value. Further, the dissolution of objective particle occurring simultaneously with the dissolution of fine powder on the surface reduces the product yield, to adversely affect its productivity.

In the process 2), sol particles are formed and grown by a hydrolytic polycondensation reaction of silicon alkoxide. Accordingly, the resulting product is spherical silica gel formed from relatively large primary particles. Traces of the large primary particles remain even after sintering the particles by heat-treatment to make them non-porous. Thus, the fluidity cannot be high even though the specific surface area is close to theoretical value.

In the process 3), silicon alkoxide is hydrolyzed to obtain a sol solution, the particles are grown, and the spherical silica gel thus obtained is made non-porous in a flame. However, since the temperature at which the treatment is carried out is 1,500° C., which is lower than the melting point, only the spherical silica that is comparable to that obtained by the process 2) is obtained.

Further, the spherical silica particles obtained by the processes 2) and 3) largely contract upon calcinating to form irregularities on the surface and the resultant particles are inferior in superficial smoothness. A decrease in superficial smoothness is undesirable because it causes a decrease in fluidity. Further, the processes 2) and 3) use expensive starting materials and generate waste-water containing organic materials derived from the starting materials and thus, necessitate treatment of the waste-water.

The process 4) gives spherical silica particles excellent in both sphericity and fluidity. However, upon calcinating, a part of the particles coagulate therebetween. The particles, were, therefore, found to contain some particles with particle size exceeding 4 times the mean particle diameter, similarly to the products of processes 1), 2) and 3).

In the process 5), since fused spherical silica is blended, fine powder on the particle surface disturb the fluidity at the time of resin blending, resulting in unsatisfactory flowing property. Further, in all the above-mentioned prior art processes, mechanical classification has to be carried out in order to attain a particle size distribution with a low coarse particle content.

Although such mechanical classification methods include a method using a screen, a gas stream classification method, etc., it is quite difficult to completely classify the particles having a mean particle diameter of about 0.1–20 μm to such an extent that the maximum particle diameter reaches a value 4 times the mean particle diameter or less.

In other words, it has hitherto been impossible to obtain non-porous spherical silica having the maximum particle diameter of 4 times the mean particle diameter or less, as well as a low thixotropic ratio.

It is an object of the present invention to provide non-porous spherical silica which hardly lowers fluidity of a liquid sealing material when it is blended therewith at the filling rate based on the liquid sealing material in the range of 40–90% by weight, which does not block a gap when used as a filler in a liquid sealing material to be poured into narrow gaps, having such a particle size distribution that the maximum particle diameter is 4 times the mean particle diameter or less, and showing a low thixotropic ratio upon being blended with resin; and to provide an industrially advantageous process for production of the same.

SUMMARY OF THE INVENTION

The present inventors have conducted extensive studies with the aim of solving the problems in the prior art processes. As a result, it has been found that high-purity non-porous spherical silica low in coarse particle content, very low in the thixotropic ratio at the time of resin blending and showing dilatancy, can be obtained by mixing an emulsion containing an aqueous solution of alkali silicate as a dispersed phase with an aqueous solution of mineral acid to form spherical silica gel, subjecting it to a neutralization reaction, thereafter heating the reaction mixture containing the spherical gel at a temperature not lower than 50° C. without isolating the formed spherical silica gel, cooling the reaction mixture, separating the solid phase from the liquid phase, washing the solid phase with a mineral acid and pure water to obtain spherical hydrated silica, disintegrating the hydrated silica after or at the time of drying, and then calcinating the dried hydrated silica. Based on this finding, this invention has been accomplished.

Thus, essentiality of the first aspect of the present invention consists in non-porous spherical silica having a mean particle diameter of 0.1–20 μm and satisfying following conditions:
(a) the maximum particle diameter is 4 times the mean particle diameter or less, and
(b) $\eta 1/\eta 2 < 1.0$, wherein $\eta 1$ and $\eta 2$ are viscosity of a 70:30 (by weight) mixture of the non-porous spherical silica and a Bisphenol A type liquid epoxy resin, as measured at a rotation number of 0.5 rpm and 2.5 rpm, respectively, in a viscometer.

The second aspect of the present invention relates to a process for producing non-porous spherical silica comprising the following steps (1) to (7):
(1) a step of emulsification comprising: preparing a water-in-oil type (W/O type) emulsion in which an aqueous solution of alkali silicate is dispersed in the form of fine particles as a dispersed phase,
(2) a step of coagulation comprising: mixing the water-in-oil type (W/O type) emulsion prepared in Step (1) with 15–50% by weight of an aqueous solution of mineral acid and thereby forming spherical silica gel so that the concentration of the mineral acid comes to 10% by weight or more after the reaction,
(3) a step of extraction comprising heating the reaction mixture containing the spherical silica gel formed in (2) at a temperature not lower than 50° C. and thereby extracting impurities,
(4) a step of washing comprising: washing the spherical silica gel from which the impurities have been extracted in (3),
(5) a step of drying comprising: drying the spherical silica gel washed in step (4),
(6) a step of disintegration comprising: carrying out disintegration at the time of the drying or after the drying of step (5), and
(7) a step of calcinating comprising: calcinating the spherical silica gel disintegrated in step (6).

Essentiality of the third aspect of the present invention consists in the above-mentioned process for producing non-porous spherical silica according to the second aspect of the present invention, wherein sulfuric acid is used as the mineral acid, and further comprising adding nitric acid and/or hydrochloric acid at a point in time during or after the step of coagulation but prior to the step of washing.

Essentiality of the fourth aspect of the present invention consists in a process for producing non-porous spherical silica comprising following steps (1) to (6):
(1) a step of emulsification comprising: preparing a water-in-oil type (W/O type) emulsion in which an aqueous solution of an alkali silicate is dispersed in the form of fine particles as a dispersed phase, wherein the total content of metals other than alkali metals and silicon in the solution is 0.1% by weight or less;
(2) a step of coagulation comprising: mixing the water-in-oil type (W/O type) emulsion prepared in step (1) with an aqueous solution of mineral acid to form spherical silica gel;
(3) a step of washing comprising: washing the spherical silica gel formed in (2);
(4) a step of drying comprising: drying the spherical silica gel washed in (3);

(5) a step of disintegration comprising: carrying out disintegration at the time of the drying or after the drying of step (4); and (6) a step of calcinating comprising: calcinating the spherical silica gel disintegrated in step (5).

Essentiality of the fifth aspect of the present invention consists in a process for producing calcinated silica particles comprising: disintegrating silica gel particles having a mean particle diameter of 0.1–100 μm by using a screen whose mesh size 10 times the maximum particle diameter or less, followed by calcinating the particles.

Essentiality of the sixth aspect of the present invention consists in a process for producing calcinated silica particles comprising: disintegrating and classifying silica gel particles having a mean particle diameter of 0.1–100 μm by using a screen whose mesh size is not larger than a maximum particle diameter, followed by calcinating.

Essentiality of the seventh aspect of the present invention consists in a process for producing calcinated silica particles according to the above-mentioned 5th or 6th aspect of the present invention, wherein the screen is made of a resin.

Essentiality of the eighth aspect of the present invention consists in a sealing resin composition containing the non-porous spherical silica according to the first aspect of the present invention.

BEST MODE FOR CARRYING OUT THE INVENTION

The non-porous spherical silica of the present invention has a mean particle diameter of 0.1–20 μm, and a maximum particle diameter of 4 times the mean particle diameter or less; and shows a extremely low thixotropic ratio at the time of resin blending. Accordingly, the non-porous spherical silica of the present invention is suitable for use as an underfill filler for flip chip, which is one of the semiconductor devices, and exhibits an extremely superior fluidity at the time of resin blending and an extremely superior permeability into narrow gaps.

In order to pour it into narrow gaps, maximum particle diameter of the silica has to be made as small as possible. However, the smaller a mean particle diameter is, the larger the viscosity of the resin into which silica is blended becomes and the lower the permeability becomes. Accordingly, it is necessary to make the maximum particle diameter smaller while making the mean particle diameter as large as possible. Although a filler is usually selected based on the maximum particle diameter so as to fit for dimension of gap, a mean particle diameter is preferably ¼ of the maximum particle diameter or more, from the viewpoint of lowering the viscosity. In other words, it is preferable that the maximum particle diameter is 4 times the mean particle diameter or less. It is further preferable that the maximum particle diameter is 3 times the mean particle diameter or less. Further, in the case of underfilling in which silica is permeated by capillary phenomenon, it is thought that a lower thixotropic ratio will give a better permeability. The term "thixotropic ratio" used in the present invention means a ratio $\eta 1/\eta 2$ in a viscosity measurement on a mixture of non-porous spherical silica and Bisphenol A type liquid epoxy resin with a weight ratio of 70:30, respectively, wherein $\eta 1$ is the value of viscosity at a rotation number of 0.5 rpm and $\eta 2$ is the value of viscosity at a rotation number of 2.5 rpm. As the Bisphenol A type liquid epoxy resin used for the viscosity measurement, a mixture of Bisphenol A type liquid epoxy resin and butyl glycidyl ether (mixing ratio 89:11 by weight) having an epoxy equivalent of 181–191 and a viscosity at 25° C. of 9–12 poise is used. Among the industrially manufactured products, Epikote 815 manufactured by Yuka Shell Epoxy K. K. is included. The viscosity measurement is preferably carried out at 50° C. As the viscometer, E-type viscometer (Model RE80R manufactured by Tohki Sangyo) is used. When silica is used for underfilling, a lower thixotropic ratio is more desirable, so that $\eta 1/\eta 2$ is preferably smaller than 1.0.

The non-porous spherical silica of the present invention has thixotropic ratio $\eta 1/\eta 2$ smaller than 1.0 when the mean particle diameter is 5–20 μm. It has $\eta 1/\eta 2$ of 0.8 or less when mean particle diameter is 0.1–5 μm. Further, it has an extremely low thixotropic ratio $\eta 1/\eta 2$ of 0.5 or less when mean particle diameter is 0.1–3 μm. The lower limit of thixotropic ratio is about 0.2. According to the present invention, non-porous spherical silica that has a low thixotropic ratio as mentioned above and, thus, is particularly useful for underfilling narrow gaps is provided. The temperature at which a viscosity is measured may be 20° C. to 80° C. A viscosity measurement is, however, easy to carry out in the neighborhood of 50° C., even though the optimum temperature may vary with the type of instrument used. The amount of filler to be blended is preferably in the neighborhood of 70%, because the larger the amount of filler to be blended is, the more the viscosity is influenced by the properties of the filler.

The reason why the non-porous spherical silica of the present invention exhibits such a low thixotropic ratio is unknown yet. It can be considered, however, this is due to that the silica of the present invention hardly contains fine powder with the size of 0.5 μm or less on its surface, so that its specific surface area is small and the total contact area with resin is small. The non-porous spherical silica of the present invention has the specific surface area, as determined by BET method, of 1.0–1.5 times the theoretical value, which means that it has a high sphericity and superior superficial smoothness. Another reason for the low thixotropic ratio may be its relatively narrow particle size distribution.

The non-porous spherical silica of the present invention has a particle size distribution with low coarse particle content, wherein the maximum particle diameter is 4 times the mean particle diameter or less. In order to reduce the viscosity at the time of resin blending, it is desirable that the variation factor of the particles, representing broadness of particle size distribution, is 15% or greater. This does not mean that the distribution is simply narrow, but that the distribution preferably has a lower content of coarse particles larger than the mean particle diameter while containing a certain quantity of small particles having a particle diameter smaller than the mean particle diameter, from the viewpoint of lowering a viscosity at the time of resin blending and a high permeability into narrow gaps. In other words, such a distribution is the distribution that shows a low thixotropic ratio and enables a closest packing structure. In relation to the non-porous spherical silica, too large variation factor means a high content of fine powder. Accordingly, the variation factor is preferably in the range of 15–100%, and more preferably in the range of 25–60%. Herein, variation factor (Cv) of particles is an index representing the dispersion of the particle diameters. It is expressed as a ratio of standard deviation σ to mean particle diameter d [μm], according to the following equation:

$$Cv = 100 \times \sigma/d \qquad \text{Formula (1):}$$

In general, any material used in semiconductors is required to have a high purity. Especially, since alkali metals such as Na, K, Li and the like, alkaline earth metals such as Ca, Mg and the like and ionic impurities such as Cl and the like may be a cause of the corrosion of aluminum wirings, it is preferable that the non-porous spherical silica of the present invention substantially contains none of these impurities. Further, in order to suppress the occurrence of soft errors, radioactive elements are structly restricted. In the case of silica for sealing material, if the content of radioactive elements exceeds 2 ppb, it may cause soft errors, which is not preferred. According to the process of the present invention, it is substantially possible to control the contents of alkali metals and alkaline earth metals to a level of 1 ppm or less and the content of radioactive impurities to a level of 2 ppb or less, wherein the term radioactive elements means U and Th. That is, it is desirable that the total content of U and Th is 2 ppb or less, and it is more desirable that the total content of U and Th is 1 ppb or less. The contents of these impurities can be directly measured by an appropriate analytical means. In the present invention, the concentrations of impurities were determined by dissolving silica in a hot aqueous solution of hydrogen fluoride, evaporating off the silica component as $SiF_4$, and analyzing the residue by ICP-MS. As the ICP-MS, Model PMS-2000, manufactured by Yokokawa Denki was used.

In the particle diameter distribution specified in the present invention, the maximum particle diameter is 4 times the mean particle diameter or less. The particle diameter distribution referred to herein is that measured by a laser diffraction scattering method, using LS-130 manufactured by Coulter Co. The mean particle diameter means a Median diameter.

As a measure of smoothness of the particle surface of non-porous spherical silica, a specific surface area SA is used. In general, specific surface area SA of a true spherical body having a diameter of d (nm) and having no pores can be expressed by the following Formula (II), when the true specific gravity thereof is designated as D:

$$SA(m^2/g)=6/(d \times D)$$ Formula (II):

It is understandable from Formula (II) that specific area SA ($m^2/g$) of the true spherical body of silica having a diameter of d (μm) and a true specific gravity of 2.2 is expressed by the following Formula (III):

$$SA=2.73/d$$ Formula (III):

Accordingly, spherical silica having a theoretical diameter of 10 μm, for example, has a specific surface area of approximately 0.27 $m^2/g$.

Spherical silica used as a sealing filler is usually spherical silica that has been subjected to calcinating treatment to make it non-porous. Accordingly its smoothness can be evaluated based on a deviation of measured value from the theoretical value of specific surface area. For example, the surface of spherical silica prepared by flame fusion method carries a number of fine spheres or irregularities formed by re-condensation of silicon vapor vaporized by the high temperature flame, so that a fused particle having a diameter of 10 μm has a specific surface area exceeding 1 $m^2/g$, which is usually about 2 $m^2/g$. A sealing material using such particles as a filler is yet insufficient in the fluidity at the time of molding.

Specific surface area of the non-porous spherical silica of the present invention is 1.5 times the theoretical value or less. Its superior smoothness can be also observed in a electron microscopic photograph thereof. Its specific surface area was measured by Betasorb 4200, manufactured by Nikkisou.

In the non-porous spherical silica of the present invention, the content of particles having sphericity of 0.9 or higher is 90% or more. Sphericity is ratio of minimum diameter (d2) to maximum diameter (d1) in a single silica particle, and expressed by the following Formula (IV):

$$Sphericity=d2/d1$$ Formula (IV):

The value of sphericity is determined by selecting twenty particles at random in an electron microscopic photograph of silica particles, measuring the maximum diameter and minimum diameter of each of the selected particles, and calculating the mean value.

The process for producing a non-porous spherical silica according to the present invention comprises the following two steps.

Step-1: <Step for Preparation of Spherical Silica Gel and Removal of Impurities by Extraction>

An emulsion containing an aqueous solution of alkali silicate as a dispersed phase is contacted and reacted with an aqueous solution of a mineral acid to form a porous spherical silica gel. After completion of a neutralization reaction, the mixture is heated to a temperature not lower than 50° C. without separating the solid phase from the liquid phase, whereby the impurities are extracted and removed to obtain porous spherical silica gel with high purity.

Step-2: <Step for Calcinating the Spherical Silica Gel>

After drying or at the time of drying the spherical silica gel obtained in Step-1, the silica gel is disintegrated and calcinated to give the silica gel the properties specified in the present invention. Hereinbelow, each of the above-mentioned steps will be explained successively.

1>Preparation of Spherical Silica Gel (Step-1)

1-1) Preparation of Emulsion

An emulsion containing an aqueous solution of alkali silicate as a dispersed phase is prepared. That is, a water-in-oil type (W/O type) emulsion, wherein a liquid not miscible with the aqueous solution of alkali silicate is used as a continuous phase and the aqueous solution of alkali silicate is dispersed therein as a dispersed phase, in the form of fine particles.

The aqueous solution of alkali silicate, the liquid for forming the continuous phase and an emulsifier are mixed together and emulsified by means of an emulsifying machine or the like, to prepare a W/O type emulsion containing the aqueous solution of alkali silicate as a dispersed phase. The particle diameter can be controlled by varying the rotation number of the emulsifying machine at the time of emulsification. The particle diameter can be decreased by increasing the rotation number of the emulsifying machine, and the particle diameter can be increased by decreasing the rotation number. Further, the particle diameter can be made finer by diluting the aqueous solution of alkali silicate with water; and the particle diameter can be increased by concentrating the aqueous solution of alkali silicate to increase its viscosity.

The alkali silicates to be used include sodium silicate, potassium silicate, lithium silicate and the like, among which sodium silicate is generally used. The silica concentration (as $SiO_2$) in the aqueous solution of alkali silicate is preferably in the range of 1–40% by weight, and further preferably in the range of 5–35% by weight. Commercially available JIS No.3 alkali silicate is easy to use.

By using an aqueous solution of alkali silicate wherein the total content of metals other than alkali metals and silicon is 0.1% by weight or less (hereinafter, such an aqueous solution of alkali silicate may be referred to as "high-purity water glass") as the starting aqueous solution of alkali silicate, non-porous spherical silica with very high purity can be produced. An aqueous solution of alkali silicate having the total content of metals other than alkali metals and silicon of 0.1% or less by weight can be prepared by dissolving naturally occurring silica rock with high purity or synthetic silica in an aqueous solution of alkali. Though the synthetic silica is not particularly limited, high-purity silica prepared from alkali silicate is preferable from the viewpoint of production cost. As the aqueous solution of alkali, an aqueous solution of sodium hydroxide is advantageous from the viewpoint of the subsequent extraction of impurities. When dissolving the naturally occurring high purity silica rock or synthetic silica in an aqueous solution of alkali, the time required for dissolution can be shortened by heating. It is also advantageous to carry out the dissolution under an elevated pressure by using an autoclave or the like. When the silica is used as a starting material for electronic materials and the like, it is preferable that the total content of the metals other than alkali metals and silicon is 0.01% or less. In this case, a lower content of radioactive elements is also preferable, and it is preferable that the total content of U and Th is 10 ppb or less.

As a liquid for forming the continuous phase, a liquid not reactive nor miscible with the aqueous solution of alkali silicate and aqueous solution of mineral acid is used. Although the species of the liquid is not particularly limited, the use of oils having a boiling point of 100° C. or higher and a specific gravity of 1.0 or less is preferable from the viewpoint of de-emulsification treatments. The weight ratio between the aqueous solution of alkali silicate and oil is 8:2 to 2:8, and preferably 8:2 to 6:4.

As the oil for forming the continuous phase above, for example, aliphatic hydrocarbons such as n-octane, gasoline, kerosene, isoparaffinic hydrocarbon oils and the like, alicyclic hydrocarbons such as cyclononane, cyclodecane and the like, aromatic hydrocarbons such as toluene, xylene, ethylbenzene, tetralin and the like, etc. can be used. From the viewpoint of stability of emulsion, isoparaffinic saturated hydrocarbons are preferred.

As an emulsifier, any emulsifiers may be used without limitation, so far as they have a function of stabilizing W/O type emulsions, and lipophilic surfactants such as polyvalent metal salts of fatty acids, water-insoluble cellulose ether, etc. can be used. From the viewpoint of subsequent treatment, nonionic surfactants are preferred. Concrete examples thereof include sorbitan fatty acid esters such as sorbitan monolaurate, sorbitan monopalmitate, sorbitan monostearate, sorbitan monooleate and the like; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan monooleate and the like; polyoxyethylene fatty acid esters such as polyoxyethylene monolaurate, polyoxyethylene monopalmitate, polyoxyethylene monostearate, polyoxyethylene monooleate and the like; glycerine fatty acid esters such as stearic acid monoglyceride, oleic acid monoglyceride, and the like; etc.

The proper amount of the emulsifier to be added is 0.05–5% by weight based on the aqueous solution of alkali silicate to be emulsified. If the treatments in various steps are taken into consideration, the amount of emulsifier is preferably 0.5–1% by weight.

1-2) Coagulation of Spherical Silica Gel, Extraction of Impurities, Washing Treatment An emulsion containing an aqueous solution of alkali silicate prepared as above as a dispersed phase is mixed with an aqueous solution of mineral acid under stirring. A neutralization reaction takes place between the mineral acid and the alkali silicate, and thereby spherical porous silica gel is formed. Although the order of the mixing procedure is not limited, it is preferable to add the emulsion containing aqueous solution of alkali silicate to the aqueous solution of mineral acid, because, if aqueous solution of mineral acid is added to an emulsion containing aqueous solution of alkali silicate, there is a risk of causing an extreme drop in mineral acid concentration at the time of reaction. Although the desired spherical particles can be obtained so far as the molar ratio of mineral acid/alkali ($Na_2O$ in water glass) is 2 or more, said molar ratio is preferably 5 or less if productivity is taken into consideration.

As the mineral acid, sulfuric acid, nitric acid, hydrochloric acid and the like can be used, among which sulfuric acid is most desirable because of strong dehydrating action and low cost. The aqueous solution of alkali silicate is preferably contacted with a mineral acid having a concentration of 15% by weight or more, and further preferably with sulfuric acid having a concentration of 20% by weight or more. When an emulsion containing aqueous solution of alkali silicate is brought into contact with an aqueous solution of mineral acid having a concentration of less than 15% by weight, the spherical particles having a particle distribution with a low coarse particle content, i.e. the object of the present invention, cannot be obtained. As the upper limit of the concentration of aqueous solution of mineral acid, 50% by weight is preferable. If sphericity and mono-dispersity are taken into consideration, it is preferable that the concentration of mineral acid is 15–35% by weight. It is also preferable that, when the reaction between the mineral acid and aqueous solution of alkali silicate has been completed perfectly, the concentration of free mineral acid in the aqueous phase is 10% by weight or more. As used herein, the term "concentration of free mineral acid" means the concentration of mineral acid which is substantially not in the form of a salt with metallic ion and the like.

A neutralization reaction between the emulsion containing the aqueous solution of alkali silicate and aqueous solution of mineral acid is, in most cases, completed in 5–120 minutes, depending on a method of agitation. The point in time when the temperature of reacted liquid phase firstly shows a descending sign is taken as the end point of the neutralization reaction.

After completion of the neutralization reaction, the temperature is elevated without separating the reacted liquid. By the elevation of temperature, the emulsion-form reaction liquid is separated into an oil phase and a silica gel particle-dispersed aqueous sulfuric acid solution phase (a de-emulsifying treatment), and at the same time the extraction and removal of impurities can be also carried out. For this purpose, a temperature of 50° C. or higher, preferably 50–120° C., and further preferably 80–100° C., is required. The time period of treatment may be properly selected in the range of from one minute to 5 hours. Usually, the treatment can be carried out for from about 30 minutes to about one hour. When the above-mentioned high-purity water glass is used as a starting material, spherical silica gel with high purity can be obtained even if extraction with heating is omitted.

According to the process of JP-A-7-69617, a de-emulsification treatment comprising adding an aqueous solution of mineral acid to the liquid reaction mixture and elevating the temperature is carried out after the neutralization reaction, and the mixture is separated into an oil phase and a phase of silica gel particle-dispersed aqueous mineral acid solution. Further, from the silica gel particle-dispersed aqueous mineral acid solution phase, silica gel particles are separated by the method of solid-liquid separation, and further an acid treatment using a mineral acid is carried out in order to lower the content of impurity elements to the desired value. Thus, the process required many steps of procedure.

Contrariwise, according to the present invention, the content of impurities including radioactive elements in the silica particles is very low, even if the solid-liquid separation in the halfway of coagulation and extraction treatment is absent. In addition, $SiO_2$ content can be made as high as 99.99% or more by washing the silica particles with a mineral acid having a concentration of 0.01% by weight or more and pure water.

In the extraction of impurities, it is also effective to add a chelate either before or after the reaction. Although the chelating agent is not particularly limited, a chelating agent exhibiting its effect under an acidic condition is preferable. Further, it is also possible to prevent the precipitation of impurities such as Th or the like after cooling, by adding nitric acid and/or hydrochloric acid either before or after the reaction. When the amount of nitric acid added is 0.1–5% based on the total added acid, the re-precipitation-preventing effect can be exhibited. Preferably, the amount of nitric acid is 0.5–3% by weight. When the above-mentioned high-purity water glass is used as a starting material, addition of chelating agent is unnecessary.

2>Step for Drying and Calcinating Treatment of Spherical Hydrated Silica (Step-2)

The spherical hydrated silica particles from which impurities have been extraction-removed in Step-1 still retain water. This water can be classified into adsorption water and bonding water. Usually, the adsorption water can readily be removed by heating at about 100° C., while the bonding water cannot be completely removed even at a high temperature of 400° C. or above. After carrying out a drying treatment to remove the adsorption water, a calcinating treatment is carried out to remove the bonding water and make the silica particles denser.

If, in the steps of drying and calcinating, the drying is carried out in a static state and the calcinating is carried out in that state, sintering among some particles takes place to increase their particle diameters. The sintering among particles can be suppressed by disintegrating the particles at the time of drying or after drying and then calcinating them. By taking such a measure, a particle size distribution having a low coarse particle content in which the maximum particle diameter does not exceed 4 times the mean particle diameter can be retained even after the calcinating.

The use of a fluidized drier is more effective, because the particles are disintegrated while being dried. The condition of drying treatment for removing the adsorption water is preferably at a temperature of 50–500° C., practically of 100–300° C. The time period of treatment may be appropriately selected in the range of from one minute to 40 hours. Usually, the drying can be achieved in 10–30 hours. By carrying out the disintegration after the drying, the silica can be calcinated without sintering among the particles even if the silica is not maintained in a fluidized state during the drying and calcinating treatment. For calcinating silica gel particles having a mean particle diameter of 0.1–100 µm, disintegration after the drying is effective for preventing the sintering among the particles.

For the disintegration before calcinating, a screen having mesh size of 10 times the maximum particle diameter or less is used. A screen having mesh size of 1–5 times the maximum particle diameter is preferable, and a screen having mesh size of 1–3 times the maximum particle diameter is more preferable. Although a way of disintegration using the screen is not limited, for example a method of using a vibrating screen or an ultrasonic screen, a method which comprises feeding the raw material into the inside of a horizontal cylindrical screen and rotating the blade equipped within the screen at a high speed to carry out a continuous disintegration (for example, Turbo Screener manufactured by Turbo Industry), etc. are included. As a material constituting the screen, those free from contamination by metal are preferable. Screens made of resin are preferable because they satisfy this condition. Although a kind of resin is not limited, polyethylene, polypropylene, nylon, carbon, acryl, polyester, polyimide, fluorine resin, etc. can be used. The use of antistatic resin is effective for preventing electrostatic charging at the time of disintegration. If desired, the step may be carried out under a highly humid condition, too. It is also possible to add some quantity of water.

It is also possible to carry out disintegration and classification simultaneously, by using a screen having mesh size not greater than the maximum particle diameter of the starting silica before the disintegration. A screen having such a mesh size that 10% of the particles is left on the screen as calculated from the particle diameter distribution of the raw silica or a larger mesh size, is industrially advantageous.

As the starting silica gel particles serving as the raw material of the disintegrating method of the present invention, those silica gel particles which have been produced by the methods other than the above-mentioned method of emulsifying and coagulating an alkali silicate can also be used. Although a method for producing silica gel particles is not limited, sol-gel method, etc. can be used. In the production of calcinated silica particle by sol-gel method, any of silicon alkoxide, alkali silicate, silica sol and the like can be used as the starting material so far as it is in the form of solution or sol. As a sol-gel method, the particle-growth method comprising using these starting materials and growing the seed particles, the method of suspending or emulsifying the starting material and then coagulating it, etc. are included. Any methods comprising coagulating the silica in the process of production to be in the state of gel may be used in the present invention without problem, so far as the starting material is in the form of solution or sol. The term "silica gel particle" means a silica particle having a specific surface area of 200 $m^2/g$ or more, and the process of the present invention is especially effective for calcinating silica gel having a specific surface area of 200 $m^2/g$ or more. From the industrial point of view, a method comprising emulsifying an alkali silicate and then coagulating it is advantageous in the point of cost, and thus is most desirable.

Although the method of calcinating after the disintegration is not particularly limited, the calcinating can be achieved in a vessel of quartz or the like at an arbitrary temperature of 600–1,500° C. As alternative methods, the methods of using a fluidized calcinating furnace, a rotary kiln, a flame calcinating furnace, etc. can also be used. Although a very slight extent of coagulation may be observed after the calcinating, a calcinated silica particle of monodisperse state, free from sintering and coagulation among the particles can be obtained by re-disintegrating the particles by the screen.

On the surface of silica particles obtained by the wet process such as Step-1, a number of silanol groups (Si—OH) are present, which are combined with atmospheric water to form the above-mentioned bonding water. The silanol groups can be removed by calcinating silica obtained by Step-i at a temperature of 1,000° C. or higher. By this treatment, dense spherical silica free from sintering among the particles and having small specific surface area can be obtained. A higher calcinating temperature gives a denser particles and a better fluidity at the time of resin blending. The calcinating temperature is thus preferably 1,100° C. or higher. Further, in order to reduce the quantity of silanol on the surface to the extremity, the calcinating process is preferably carried out at a temperature of 1,150° C. or higher.

The time period of calcinating may be properly selected in the range of from one minute to 20 hours, depending on a calcinating temperature. Usually, the specific surface area can be decreased to the prescribed value by 2 to 10 hours of calcinating. As an atmosphere under which the calcinating treatment is carried out, oxygen or carbon dioxide may be used and, if necessary, inert gases such as nitrogen, argon and the like can also be used. From the practical point of view, air is advisable. As an apparatus for carrying out the calcinating treatment, a calcinating furnace in which silica particles are treated in a static state can be used. It is also possible to use apparatuses for subjecting silica particles to a calcinating treatment while keeping the particle in a fluidized state, such as a fluidized calcinating furnace, a rotary kiln, a flame calcinating furnace, etc. can also be used. As the source of heating, electric heater or inflammable gases can be used. Although water content in the silica gel before the calcinating is not particularly limited, it is preferable to calcinate silica gel whose water content has been reduced as much as possible, in order to prevent coagulation among the particles at the time of calcinating.

The calcinated silica particles of the present invention is silica particle having a mean particle diameter of 0.1–100 μm and a specific surface area of less than 200 m$^2$/g. The present invention is particularly effective for production of silica particles having a mean particle diameter of 1–20 μm, and for production of silica particles whose specific surface area is in the neighborhood of the theoretical value. Although in the present invention the specific surface area of silica gel particle before calcinating is not particularly limited, silica gel particles from sol-gel process, which usually have a specific surface area of 400 m$^2$/g or more, are sintered to have a specific surface area of 200 m$^2$/g or less, preferably of 10 times the theoretical value or less, and further preferably of 3 times the theoretical value or less.

It has been found that, according to the present invention, the sintering among particles does not take place at the time of calcinating if disintegration is carried out prior to the calcinating. Thus, the present invention has made it possible to produce non-porous spherical silica in which the ratio of maximum particle diameter to mean particle diameter is 4 or less, by forming spherical silica gel in which the ratio of maximum particle diameter to mean particle diameter is 4 or less and disintegrating the spherical silica gel before calcinating. Although the particle diameter before calcinating is relatively easy to control in a sol-gel process, it has been impossible to produce particles having a low coarse particle content because partial sintering among the particles takes place during the calcinating until the specific surface area reaches 200 m$^2$/g or less. Particularly when the specific surface area is reduced to 3 times the theoretical value or less, the sintering among the particles was significant. However, by forming silica gel particles in which the maximum particle diameter is 4 times the mean particle diameter or less according to the above-described procedure, calcinated silica particles in which the maximum particle diameter is 4 times the mean particle diameter or less can be produced directly, without any coagulation among the particles during calcinating.

The non-porous spherical silica produced according to the present invention is low in the content of coarse particles, and shows a very low viscosity when mixed into a resin. Accordingly, it can be suitably used as a filler for a liquid sealant to be poured into narrow gaps.

Hereinbelow, examples and comparative examples are shown to illustrate the invention concretely.

EXAMPLE 1

1>Preparation of Spherical Silica Gel Particle 1-1) Preparation of Emulsion

As a water glass, JIS No.3 water glass was diluted with water to adjust its SiO$_2$ content to 15%. As a liquid for forming the continuous phase, an isoparaffinic hydrocarbon oil ("Isosol 400", manufactured by Nippon Sekiyukagaku Kogyo) was used. As an emulsifier, sorbitan monooleate ("Rheodol SP-O 10", manufactured by Kao) was used. Thus, 20 kg of the water glass, 7.5 kg of Isosol 400 and 0.18 kg of Rheodol SP-O 10 were weighed out. The starting materials were mixed together, roughly agitated by means of a stirrer, and then emulsified by means of an emulsifying machine at a rotation speed of 2,980 rpm. 415 g of the emulsion was weighed out therefrom.

1-2) Coagulation of Spherical Silica Gel, Extraction of Impurities, and Washing Treatment While stirring 575 g of prepared 28% aqueous sulfuric acid solution at room temperature, the above-mentioned emulsion was added thereto. After completion of the addition, the stirring was continued for further 40 minutes at room temperature. Then, 40 g of 62% nitric acid (industrial grade) was added under stirring, the stirring was continued for further 20 minutes, and the mixture was heated to 100° C. under stirring and kept at this temperature for 30 minutes. By this treatment, the emulsion-form reaction mixture was separated into an oily phase (upper layer) and an aqueous phase containing dispersed silica gel particles (lower layer).

The oily phase was removed, and the silica gel particles in the aqueous phase was filtered and washed by the conventional method. Thus, after a substitution-washing of reaction mixture with 0.01% aqueous sulfuric acid solution, the silica gel particles were repeatedly washed with pure water until pH of the washing reached 4 or higher. Then, dehydration was carried out by means of a suction filter to obtain spherical silica gel.

2>Step for Drying, Disintegration and Calcinating of Spherical Silica Gel

The spherical silica gel thus obtained was dried at 120° C. for 20 hours to obtain 100 g of a silica gel particles. The dried silica gel particles thus obtained was disintegrated by a screen made of polyester having a mesh size of 33 μm, packed into a quartz beaker (1 liter) and calcinated at 1,150° C. for 6 hours.

Analysis of the calcinated silica particles thus obtained revealed that a concentrations of each of alkali metals such as Na, K, Li, etc., alkaline earth metals such as Ca, Mg, etc. and transition metals such as Cr, Fe, Cu, etc. was 1 ppm or less and the total concentration of radioactive elements (U and Th) was 0.1 ppb or less. Tables 1 and 2 illustrate the results of various measurements and observation of the silica gel particle obtained herein. The resultant silica particles had a mean particle diameter of 1.3 µm, a maximum particle diameter of 3 µm, and a true specific gravity of 2.19. As measured by BET method, a specific surface area was 2.7 m²/g, which was 1.3 times the theoretical value. The silica particles obtained was spherical silica particles, having the content of particles with a sphericity of 0.9 or above of 90% or more as determined on an electron microscopic photograph, as well as superior surface smoothness.

EXAMPLE 2

Spherical silica was produced by the same procedure as of Example 1, except that JIS No.3 water glass was diluted with pure water to adjust $SiO_2$ content to 27%. The results of various measurements and observation on the silica particles obtained are shown in Tables 1 and 2.

EXAMPLE 3

Spherical silica was prepared under the same conditions as in Example 1, except that JIS No.3 water glass was concentrated to adjust its viscosity at 25° C. to 350 cp. Results of various measurements and observation on the silica particles thus obtained are shown in Tables 1 and 2.

EXAMPLE 4

Spherical silica was prepared in the same manner as in Example 3, except that rotation number of the emulsifying machine was adjusted to 1,800 rpm. Results of various measurements and observation on the silica particles thus obtained are shown in Tables 1 and 2.

EXAMPLE 5

Spherical silica was prepared in the same manner as in Example 4, except that the JIS No.3 water glass was replaced with an aqueous solution of alkali silicate in which the total content of metals other than alkali metals and silicon was 0.1% by weight or less. Results of various measurements and observation on the silica particles thus obtained are shown in Tables 1 and 2.

EXAMPLE 6

The silica particles obtained by after drying step in Example 3 was disintegrated by passage through a screen made of polyethylene having a mesh size of 33 µm with Turbo Screener TS 250×200, manufactured by Turbo Kogyo Co. The particles which have passed the screen were calcinated in a quartz-made beaker at 1,150° C. for 6 hours to obtain calcinated silica particles. Results of various measurements and observation on the silica particles thus obtained are shown in Tables 3 and 4.

EXAMPLE 7

The silica particles obtained after the drying step in Example 3 was disintegrated by passage through a screen made of polyethylene having a mesh size of 24 µm with Turbo Screener TS 250×200, manufactured by Turbo Kogyo Co. The particles which have passed the screen were calcinated in a quartz-made beaker at 1,150° C. for 6 hours to obtain calcinated silica particles. Results of various measurements and observation on the silica particles thus obtained are shown in Tables 3 and 4.

EXAMPLE 8

The silica particles obtained after the drying step in Example 4 was disintegrated and classified by passage through a screen made of polyethylene having a mesh size of 24 or 33 µm with Turbo Screener TS 250×200, manufactured by Turbo Kogyo Co. In the particle size distribution of the sample before the disintegration and classification, the particle diameter corresponding to a mesh-size with which 10% of the particles are left on screen was 19 µm. The particles which have passed respective screens were calcinated in a quartz-made beaker at 1,150° C. for 6 hours to obtain calcinated silica particles. Results of various measurements and observation on the silica particles thus obtained are shown in Tables 5.

COMPARATIVE EXAMPLE 1

Silica Ace AFG-S (manufactured by Mitsubishi Rayon) was pulverized with a ball mill and its mean particle diameter was adjusted to about 6 µm. Using a double tube burner, fused spherical silica was prepared. The conditions of fusion was as follows: LPG: 3.3 Nm³/h, oxygen: 17.6 Nm³/h, silica feeding rate: 10 kg/h. The fused spherical silica thus obtained was classified and the fine and coarse particles were removed. Results of various measurements and observation on the silica particles after the classification are shown in Tables 1 and 2. Although mean particle diameter and particle size distribution were comparable to those in Example 3, the specific surface area was 2.3 m²/g, which was larger than that of Example 3. Although the particles have a mean particle diameter and a maximum diameter comparable with those of the particles of Example 3, they had larger viscosity than that of Example 3, which attributes to the larger specific surface area.

COMPARATIVE EXAMPLE 2

Calcinated silica particles were prepared by calcinating the silica particles obtained after the drying step in Example 6, without disintegration, in a quartz-made beaker at 1,150° C.

COMPARATIVE EXAMPLE 3

Calcinated silica particles were obtained in the same manner as in Example 6, except that a stainless steel-made screen having a mesh size of 32 µm was used for disintegration of the silica gel particles.

With respect to the impurity contents of the silica particles obtained in Examples 1–7, concentrations of Na, K, Al, Ti, Fe and Zr were all 0.1 ppm or less; and the contents of U and Th were all 0.1 ppb or less. The contents of impurities of the silica particles of Comparative Example 1 were as follows; Na: 0.4 ppm, K: 0.1 ppm or less, Al: 1.0 ppm, Ti: 0.1 ppm, Fe: 24 ppm, Zr: 0.1 ppm or less. In the sample of Comparative Example 3, Fe content was 5 ppm, indicating a contamination by the stainless steel.

Properties of the silica particles obtained in Examples 1–5 and Comparative Examples 1–2 are shown in Tables 1 and 2. Properties of the silica particles obtained in Examples 6 and 7 and Comparative Example 2 are shown in Tables 3 and 4. The particle diameters were measured with LS-130, manufactured by Coulter Co. The mean particle diameter expresses a Median value, and the maximum particle diameter represents a particle diameter where "under-screen" reaches 100.00%. Regarding the fraction on 32 µm screen, 50 g of the sample was made into a slurry in 150 g of pure water, passed through a stainless steel-made screen, and the fraction remaining on the screen was dried, on which the measurement was carried out. The 25 µm and 50 µm gap-permeabilities were evaluated by heating a die having gaps of 5 mm in width, 20 μm in gap dimension and 18 mm in gap length up to 75° C., dropping down the sample of measurement onto one end thereof, and measuring the period of time necessary for permeation to the other end by the capillary phenomenon. The result is expressed in the term of time (minutes). As the sample of measurement, a uniformly blended mixture of Epikote 815 (manufactured by Yuka Shell Epoxy K.K.) and silica particles at a silica blending rate of 65% by weight (26 g of silica particles and 14 g of Epikote 815 were mixed together) was used. The resin blending viscosity is a viscosity of a mixture consisting of Epikote 815 (Yuka Shell epoxy K.K.) and silica at a silica blending ratio of 70% by weight (28 g of silica and 12 g of Epikote were mixed together), measured at 50° C. The viscometer used was Model RE80R manufactured by Tohki Sangyo (E type viscometer).

In all the samples of Examples 1–7, the maximum particle diameter was 3 times the mean particle diameter or less. In Examples 6 and 7, the particles left on 32 μm screen was 0.001% by weight or less, and showed no coagulation among the particles. $\eta1/\eta2$ representing the thixotropic property was 1.1 or less, in all the samples. Particularly in Examples 1–3 where the maximum particle diameter was 5 μm or less, $\eta1/\eta2$ was 0.8 or less. In Examples 1 and 2 where mean particle diameter was 3 μm or less, $\eta1/\eta2$ was 0.5 or less.

On the other hand, in the sample of Comparative Example 1 prepared by flame fusion method, $\eta1/\eta2$ was 1.3. In the sample of Comparative Example 2 where calcinating was carried out without disintegration by screen, the maximum particle diameter was 74 μm, and the particles remained on 32 μm screen was 3.2%, showing coarse particles due to coagulation among the particles. In the coarse particles, particles were sintered to one another so strongly that they could not be disintegrated. The 20 μm and 50 μm permeabilities could not be determined, because the maximum particle diameter was 20 μm or larger and permeation did not take place within 30 minutes.

TABLE 2-continued

| Example and Comparative Example | Viscosity * [Pa · s] | | | Gap permeability ** [Minutes] | |
|---|---|---|---|---|---|
| | 0.5 rpm | 2.5 rpm | η1/η2 *** | 50 μm | 20 μm |
| Comparative Example 1 | 12.3 | 10.1 | 1.3 | 5 | 10 |
| Comparative Example 2 | 7.8 | 6.5 | 1.2 | <30 | <30 |

\* Viscosity of a mixture with Epikote 815 (manufactured by Yuka Shell Epoxy K.K.) at silica: epoxy ratio = 70:30 by wt., at 50° C.
\*\* Determined by heating up to 75° C. a die having gaps of 5 mm in width, 20 or 50 μm in gap dimension and 18 mm in length, dropping down the sample onto one end of the die, and measuring a period of time until the sample reaches the other end by capillary phenomenon. Result is expressed by time (minutes). The sample is a uniform mixture of silica and Epikote 815 (manufactured by Yuka Shell Epoxy K.K.) at a silica compounding rate of 65% by weight (26 g of silica was mixed with 14 g of Epikote 815). 20 μm gap permeability was not tested on Example 4 and Example 5 because maximum particle diameter in these Examples was greater than 20 μm.
\*\*\* η1: Viscosity at 0.5 rpm; η2: Viscosity at 2.5 rpm.

TABLE 3

| | Before calcinating | | After calcinating | | |
|---|---|---|---|---|---|
| | Mean particle diameter [μm] | Maximum particle diameter [μm] | Mean particle diameter [μm] | Maximum particle diameter [μm] | Mesh size of screen [μm] |
| Example 6 | 4.5 | 18 | 4.0 | 12 | 32 |
| Example 7 | 4.5 | 18 | 4.0 | 12 | 24 |
| Comparative Example 2 | 4.5 | 18 | 6.2 | 74 | Not used |

TABLE 1

| Example and Comparative Example | SiO$_2$ Concentration in water glass [% by wt.] | Mean particle diameter [μm] | Maximum particle diameter [μm] | Variation factor of particle diameter [%] | Specific surface area [m$^2$/g] | Ratio of observed value to theoretical value |
|---|---|---|---|---|---|---|
| Example 1 | 15 | 1.3 | 3 | 31.4 | 2.7 | 1.3 |
| Example 2 | 27 | 2.7 | 5 | 28.0 | 1.5 | 1.5 |
| Example 3 | 30 | 4.0 | 12 | 49.6 | 0.69 | 1.0 |
| Example 4 | 30 | 9.0 | 26 | 49.3 | 0.33 | 1.1 |
| Example 5 | 30 | 9.1 | 27 | 44.6 | 0.34 | 1.1 |
| Comparative Example 1 | — | 4.1 | 12 | 43.8 | 2.3 | 3.4 |
| Comparative Example 2 | 30 | 6.2 | 74 | 102 | 0.65 | 1.5 |

TABLE 2

| Example and Comparative Example | Viscosity * [Pa · s] | | | Gap permeability ** [Minutes] | |
|---|---|---|---|---|---|
| | 0.5 rpm | 2.5 rpm | η1/η2 *** | 50 μm | 20 μm |
| Example 1 | 14.3 | 33.8 | 0.42 | 4 | 7 |
| Example 2 | 10.2 | 24.5 | 0.42 | 4 | 6 |
| Example 3 | 4.8 | 6.5 | 0.74 | 3 | 5 |
| Example 4 | 4.3 | 4.6 | 0.96 | 2 | — |
| Example 5 | 4.3 | 4.4 | 0.98 | 2 | — |

TABLE 4

| | After calcinating | |
|---|---|---|
| | On 32 μm screen [% by wt.] | 20 μm gap permeability [minutes] |
| Example 6 | <0.001 | 5 |
| Example 7 | <0.001 | 5 |
| Comparative Example 2 | 3.2 | <30 |

TABLE 5

| | Before disintegration and classification | | After disintegration and classification | | After calcinating | | |
|---|---|---|---|---|---|---|---|
| | Mean particle diameter [μm] | Maximum particle diameter [μm] | Mean particle diameter [μm] | Maximum particle diameter [μm] | Mean particle diameter [μm] | Maximum particle diameter [μm] | Mesh size of screen |
| Example 8-1 | 10.5 | 34 | 10.3 | 31 | 8.9 | 24 | 32 |
| Example 8-2 | 10.5 | 34 | 8.5 | 22 | 7.7 | 19 | 24 |

INDUSTRIAL APPLICABILITY

According to the process of the present invention, high-purity spherical silica particles having a high purity, quite low in the content of impurities including alkali metals and radioactive elements such as uranium and the like and low in the coarse particle content can be obtained by using an aqueous solution of alkali silicate as the starting material.

Since the non-porous spherical silica obtained according to the method of the present invention shows a low thixotropic ratio at the time of resin blending, it is especially suitable for use as a filler for liquid sealing material to be poured into narrow gaps of electronic parts, as compared with the products of prior art.

The invention claimed is:

1. A process for producing non-porous spherical silica comprising following steps (1)–(7):
   (1) a step of emulsification comprising: preparing a water-in-oil type (W/O type) emulsion in which an aqueous solution of alkali silicate is dispersed in the form of fine particles as a dispersed phase;
   (2) a step of coagulation comprising: mixing the water-in-oil type (W/O type) emulsion prepared in step (1) with 15–20% by weight of an aqueous solution of mineral acid and thereby forming spherical silica gel so that the concentration of the mineral acid comes to 10% by weight or more after the reaction;
   (3) a step of extraction comprising: heating the reaction mixture containing the spherical silica gel formed in step (2) at a temperature not lower than 50° C. and thereby extracting impurities;
   (4) a step of washing comprising: washing the spherical silica gel from which the impurities have been extracted in step (3);
   (5) a step of drying comprising: drying the spherical silica gel washed in step (4);
   (6) a step of disintegration comprising carrying out disintegration with a screen at the time of the drying or after the drying of step (5);
   (7) a step of calcinating comprising: calcinating the spherical silica gel disintegrated in step (6).

2. The process for producing non-porous spherical silica according to claim 1, wherein sulfuric acid is used as the mineral acid, and further comprising adding nitric acid and/or hydrochloric acid at a point in time during or after the step of coagulation but prior to the step of washing.

3. A process for producing non-porous spherical silica comprising the following steps (1)–(6):
   (1) a step of emulsification comprising: preparing a water-in-oil type (W/O type) emulsion in which an aqueous solution of alkali silicate is dispersed in the form of fine particles as a dispersed phase, wherein the total content of metals other than alkali metals and silicon in the solution is 0.1% by weight or less;
   (2) a step of coagulation comprising: mixing the water-in-oil type (W/O type) emulsion prepared in step (1) with an aqueous solution of mineral acid to form spherical silica gel;
   (3) a step of washing comprising: washing the spherical silica gel formed in step (2);
   (4) a step of drying comprising: drying the spherical silica gel washed in step (3);
   (5) a step of disintegration comprising: carrying out disintegration with a screen at the time of the drying or after the drying of step (4);
   (6) a step of calcinating comprising calcinating the spherical silica gel disintegrated in step (5).

* * * * *